United States Patent
Skrotskaya et al.

(10) Patent No.: US 6,332,411 B1
(45) Date of Patent: Dec. 25, 2001

(54) FURNACE

(76) Inventors: Olga Panteleimonovna Skrotskaya, ul. Akademika Yangelia, d.20, kv. 155, 113534 Moscow (RU); Viktor Georgievich Skrotsky, deceased, late of Moscow (RU); by Olga P. Skrotskaya, heir, ul. Akademika Yangelia, d.20, kv. 155, 113534 Moscow (RU)

( * ) Notice: Subject to any disclaimer, the term of this patent is extended or adjusted under 35 U.S.C. 154(b) by 0 days.

(21) Appl. No.: 09/646,207

(22) PCT Filed: Jan. 12, 2000

(86) PCT No.: PCT/RU00/00005

§ 371 Date: Sep. 14, 2000

§ 102(e) Date: Sep. 14, 2000

(87) PCT Pub. No.: WO00/42355

PCT Pub. Date: Jul. 20, 2000

(30) Foreign Application Priority Data

Jan. 14, 1999 (RU) .................................. 99100159

(51) Int. Cl.⁷ .................................................. F23L 7/00
(52) U.S. Cl. ...................... 110/297; 110/301; 110/302; 110/308; 126/77; 126/146
(58) Field of Search .................... 110/301, 302, 110/308, 305, 208, 295, 296, 297, 182.5, 314, 348; 126/77, 85 B, 146

(56) References Cited

U.S. PATENT DOCUMENTS

| | | | |
|---|---|---|---|
| 1,517,291 | * 12/1924 | Jacobus | 110/308 |
| 1,726,527 | * 9/1929 | Cowles et al. | 110/308 |
| 1,731,901 | * 10/1929 | Malvos et al. | 110/308 |
| 1,790,110 | * 1/1931 | Nygaard et al. | 110/308 |
| 2,545,680 | * 3/1951 | De Witt | 128/77 |
| 3,219,024 | * 11/1965 | Hottenroth | 126/75 |
| 4,316,445 | 2/1982 | Eisiminger . | |
| 4,793,322 | * 12/1988 | Shimek et al. | 126/80 |
| 5,016,609 | * 5/1991 | Shimek et al. | 126/85 B |
| 5,542,407 | * 8/1996 | Hawkinson | 126/77 |

FOREIGN PATENT DOCUMENTS

| | | |
|---|---|---|
| 32 00 194 | 7/1983 | (DE) . |
| 32 45 587 | 6/1984 | (DE) . |
| 196 12 403 | 10/1997 | (DE) . |
| 0 046 248 | 2/1982 | (EP) . |
| 0 124 945 | 11/1984 | (EP) . |
| 2 482 702 | 11/1981 | (FR) . |
| 1 569 696 | 6/1980 | (GB) . |
| 2 089 969 | 6/1982 | (GB) . |
| 2 172 989 | 10/1985 | (GB) . |
| 2 187 276 | 9/1987 | (GB) . |
| 2 251 302 | 7/1992 | (GB) . |
| 2 253 050 | 8/1992 | (GB) . |
| 2456 | 3/1927 | (RU) . |
| 5987 | 7/1928 | (RU) . |
| 2 027 953 | 1/1995 | (RU) . |
| 2 031 315 | 3/1995 | (RU) . |

\* cited by examiner

Primary Examiner—Henry Bennett
Assistant Examiner—K. B. Rinehart
(74) Attorney, Agent, or Firm—Collard & Roe, P.C.

(57) ABSTRACT

The furnace is intended for burning solid fuel (mainly fire-wood) in continuous mode of operation, with significant amount of heat released in the form of hot combustion products usable in wood-drying installations, for house heating, destroying of refuse, etc. The invention allows simplifying the design of the furnace, features high efficiency of fuel burning and high power density, and improves reliability and serviceability. The furnace includes the shaft loading hopper (1), the combustion chamber (2) located under the loading hopper (1), and the expansion chamber (3) located behind the combustion chamber (2) and provided with the forced ventilation (5). The atmospheric air, heated to the temperature of combustion products in the expansion chamber (3), is supplied to the combustion chamber (2).

17 Claims, 5 Drawing Sheets

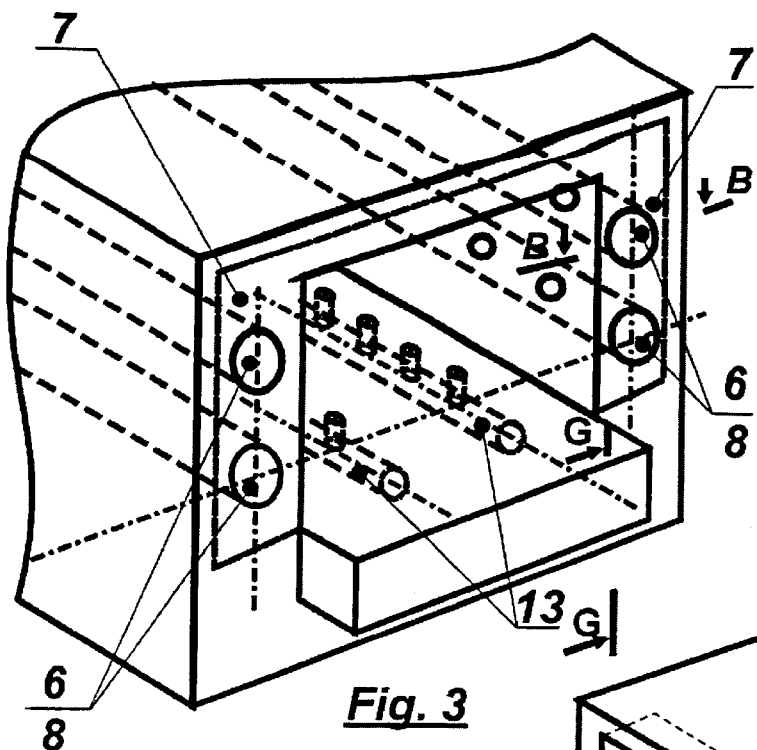
Fig. 3
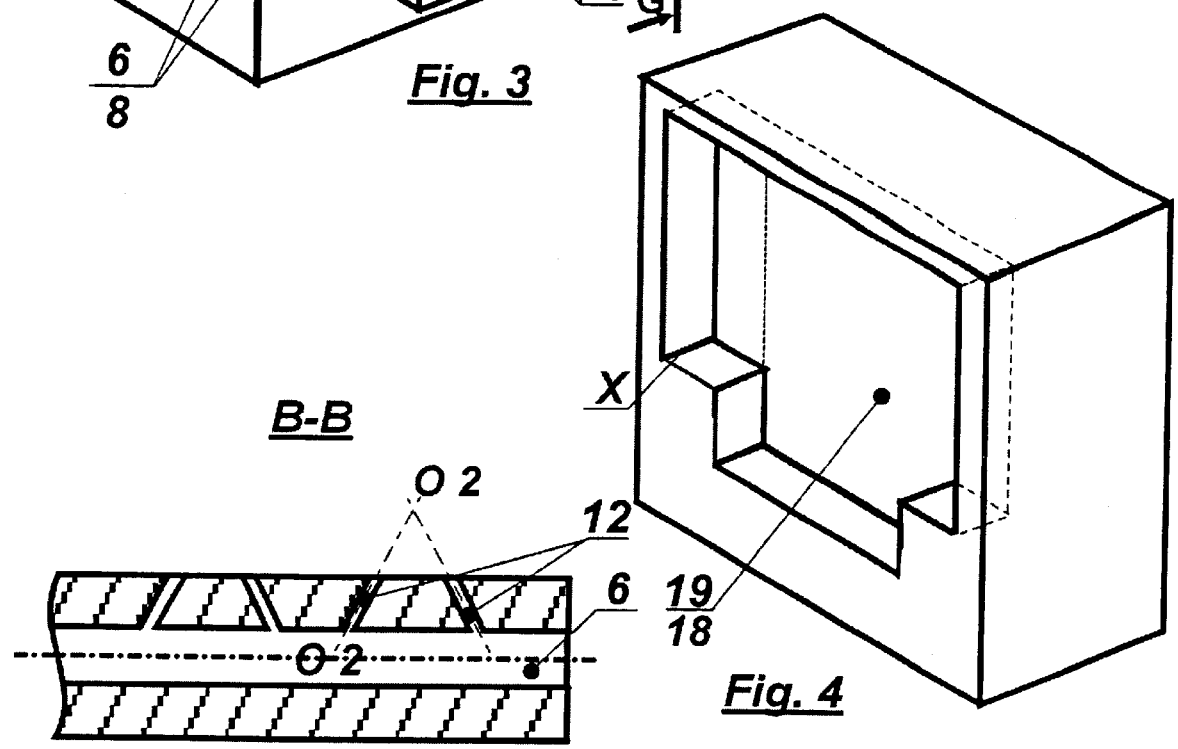
B-B
Fig. 5
Fig. 4
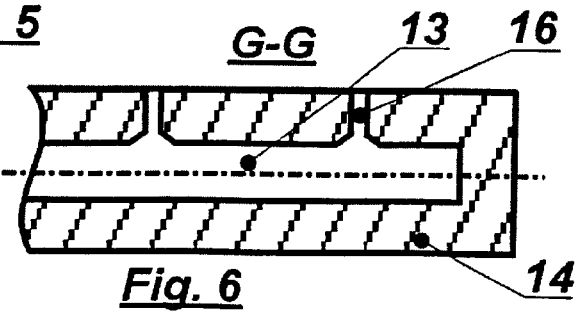
G-G
Fig. 6

D-D

E-E

FURNACE

TECHNICAL FIELD

The invention is intended for burning solid fuel (mainly fire-wood, e.g. woodworking waste products), in continuous mode of operation, with significant amount of heat released in the form of hot combustion products usable in wood-drying installations, for house heating, etc.

THE BACKGROUND ART

Fronted solid fuel furnaces with fire-grates have been known thus far: e.g., see U.S. Pat. No. 4,316,445, FR 2 482 702, GB 2 253 050, GB 2 089 969, GB 2 251 302, RU 2 027 953, RU 2 031 315. The presence of grates in those furnaces results in a complicated design and inconvenient maintenance. Besides, obtaining high temperatures in grate-equipped furnaces is prevented by the fact that such temperatures may destroy grates. Fronted charging used in those furnaces leads to excessive air inflow through the furnace door when new portions of fuel are charged. This, in turn, results in a lower temperature in the combustion chamber and, therefore, in an incomplete fuel combustion. Apart from that, a sharp increase of the volume of furnace gases leads to an increasing loss of heat carried away with outgoing gases. The above-listed imperfections bring down the efficiency of fuel combustion and power density of such furnaces and thus prevent them from being extensively used in industry.

There exists another type of solid fuel furnaces, with vertical shaft fuel charging into the combustion chamber. In such furnaces, the ashtray is located under the combustion chamber: see, e.g., EP 0 046248, DE 196 12 403.

To improve the burning efficiency, some types of furnaces provide for air supply to the combustion chamber. The air can be previously heated for an even greater efficiency: see, e.g., GB 1 569 696, DE 32 00 194, DE 32 45 587, EP 0124 945. The air thus supplied is called primary, secondary, or even tertiary air, depending on where and at which stage of burning it is supplied. The air-supply process is thoroughly monitored and controlled to ensure the necessary and safe burning. For this purpose, various auxiliary devices are used, which have to be permanently monitored by operating stuff. The slightest breakdown of these devices can upset the process of burning which, in turn; can result in various undesirable situations, and even in an emergency. Although such furnaces offer more efficiency that those listed above, it is clear that they have a more complicated design and are inconvenient for maintenance. They require special personnel training, and they do not allow for high-efficiency and high power-density burning.

SPECIFICATION

The object of the present invention is to get rid of the aforementioned imperfections found in analogous furnaces, i.e. to create a furnace simple in design and production, inexpensive, reliable, and convenient in service at all stages of maintenance, and featuring high efficiency of fuel burning and high power density. This purpose in ensured by the invention's features described below. Each of those features serves for a specific function, whereas taken together and interacting, they provide a solution to the problem.

In the furnace proposed, a shaft-loading hopper located over a combustion chamber is used. An expansion chamber is located behind the combustion chamber so that their long axes are coincident, the cross-section area of the expansion chamber exceeding the cross-section area of the combustion chamber. The furnace is provided with an exhaust pipe with forced ventilation serving for air exhaust. The heated air supply to the combustion chamber is effected in such a way as to provide for the suplied air temperature as close as possible to that of the expansion chamber gases and includes frontal, lateral and lower air supply. The frontal air supply to the combustion chamber includes several pipes located in the internal space of the expansion chamber; one end of each pipe is open to the atmosphere, while the other communicates with an inlet of the corresponding through channel, which is located inside the combustion chamber and along its walls; the outlet of the channel communicates with the internal space of the combustion chamber. The lateral air supply to the combustion chamber is designed in the form of through holes in the combustion chamber's lateral walls, which communicate with the internal space of the combustion chamber and with the through channels for frontal air supply. The lower air supply to the combustion chamber includes several channels located inside the combustion chamber and along its lower wall; similar to the frontal air-supply channels, one end the lower air-supply channels communicates with special pipes put in the expansion chamber for that purpose; the pipes, in turn, are open to the atmosphere. Each of those channels communicates with the internal space of the combustion chamber via through holes located in between. The common long axis of the combustion chamber and the expansion chamber can simultaneously be their symmetry axis. The long axes of the pipes located in the expansion chamber and those of the through channels located inside the combustion chamber and along its lateral and lower walls and communicating with the pipes, coincide and are parallel to each other and to the combustion and expansion chambers' common symmetry axis. The through holes providing for lateral air supply into the combustion chamber are grouped in pairs so that the axes of the holes in each pair intersect within the bounds of the neighboring half of the combustion chamber's internal space. The long axes of the through holes providing for lower air supply can be parallel to each other and at the same time perpendicular to the long axis of the channels located in the combustion chamber's lower wall. The loading hopper is provided with a cap installed with a clearance ensuring air access for the exhaust of water vapor and hot volatile fractions that form during wood pyrolysis. In case of the optimal furnace design the amounts of air entering the combustion chamber via frontal and lateral supplies are related as 10:1, while for frontal and lower supplies, this ratio is 100:1. These ratios should be taken into consideration when calculating the diameters and numbers of the through holes and channels via which the air is supplied into the combustion chamber. The lower air supply into the combustion chamber rules out ash caking. Inside the combustion chamber, between the outlets of the through channels (located inside the chamber and along its lateral walls) and the internal space of the combustion chamber's front wall located opposite to the outlets, a clearance is arranged serving for frontal air passage from the through channels to the combustion chamber. In the lower part of the expansion chamber there is a door for ash removal. To lower the combustion products' stream speed and to ensure ash settling in the expansion chamber, the cross-sectional area of the expansion chamber can be made significantly greater than that of the combustion chamber. The planes of the above-mentioned cross-sections of the combustion and extension chambers are perpendicular to their common axis of symmetry. The proposed furnace design allows for modular production using readily available and inexpensive materials, e.g., high-temperature ceramics. Pipes located in the expansion chamber are made of a material with a high heat transmission coefficient; the pipes' material, diameter and wall thickness should be taken into consideration when optimizing for suplied air temperatures as close as possible to those of the expansion chamber gases. Forced oxygen-enriched air can be supplied into the combustion chamber through the channels located in the lower wall of the latter to create special short-time high-temperature conditions. A maximum heat-insulation of the combustion chamber and expansion chamber is provided.

Shaft charging used in the proposed furnace ensures stable burning. A loading hopper located directly over the combustion chamber allows to prepare the fuel for combustion since in that way the fuel passes the stages of drying, partial pyrolysis and heating up to the ignition temperature or near it.

Supplying to the combustion chamber frontally the atmospheric air heated up to the temperature of combustion products in the expansion chamber, in combination with shaft fuel charging, ensures stable burning at maximum possible temperatures (which may depend on fuel type) in excess of oxygen, thus favoring increase of the furnace power density.

Lateral air supply into the combustion chamber ensures high intensity of burning; in addition, grouping in pairs the through holes intended for lateral air supply into the combustion chamber so that their axes, for each separate pair, intersect within the bounds of the neighboring half of the combustion chamber's internal space, favors turbulence of intermediate combustion products, and therefore results in a more active burning due to better heat transmission inside the burning area, temperature gradient equalizing, and better heat-mass transfer.

Lower air supply into the combustion chamber allows one to rule out ash sintering, since ash cakes appearing during burning are self destroyed.

The use of forced ventilation in the expansion chamber ensures safe burning. Besides, it is the forced ventilation that provides for negative feedback ensuring a self-regulating process of burning in the proposed furnace.

Pre-production model tests of the proposed furnace showed that burning temperature in the furnace is so high that there is virtually no CO in the exhaust; therefore, the furnace is ecologically safe and does not require any additional efforts and explicit costs to ensure ecological safety.

The above-mentioned geometrical arrangement of the combustion chamber and expansion chamber results in such a geometry of combustion products' streams forming heat-mass transfer process, which ensures maximum power density of the furnace.

BRIEF DESCRIPTION OF DRAWINGS

The design of the proposed furnace is illustrated in figures; in

FIG. 3 gives an axonometric view of the combustion chamber's part with cross-section expanded; in FIG. 4, a section of FIG. 3 is shown;

FIG. 5 gives an Б—Б section of FIG. 3;

FIG. 6 gives a G—G section of FIG. 3; an axonometric view of the expansion chamber is depicted in FIG. 7;

FIG. 9 gives an E—E section of FIG. 1; in

DESCRIPTION OF THE PREFERRED EMBODIMENT

Figure 1:
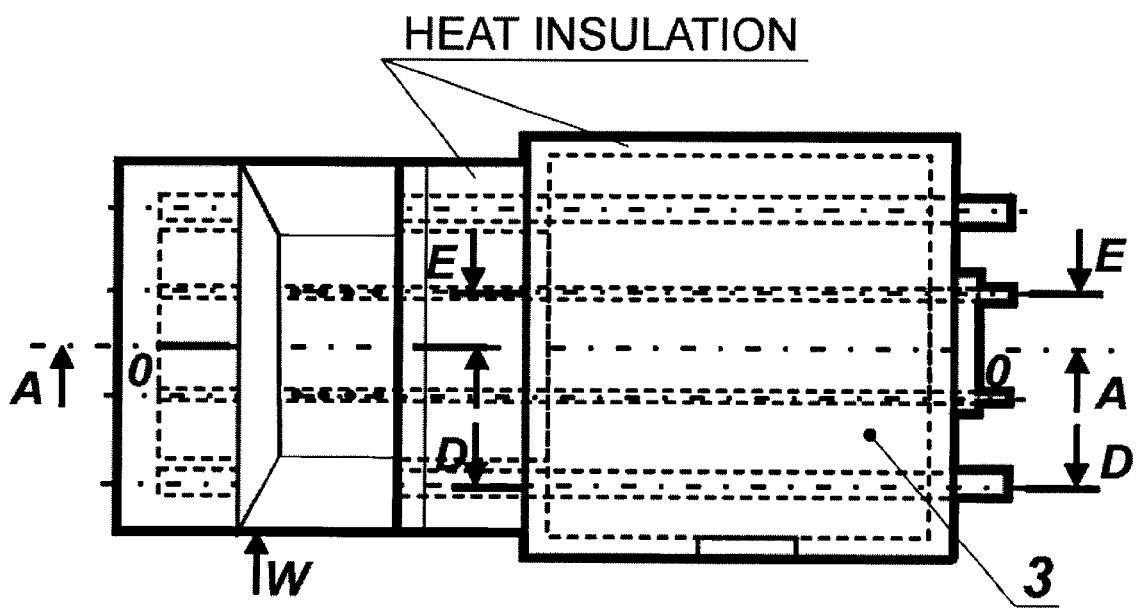
FIG. 1, a schematic plan view of the furnace is given.
Figure 2:
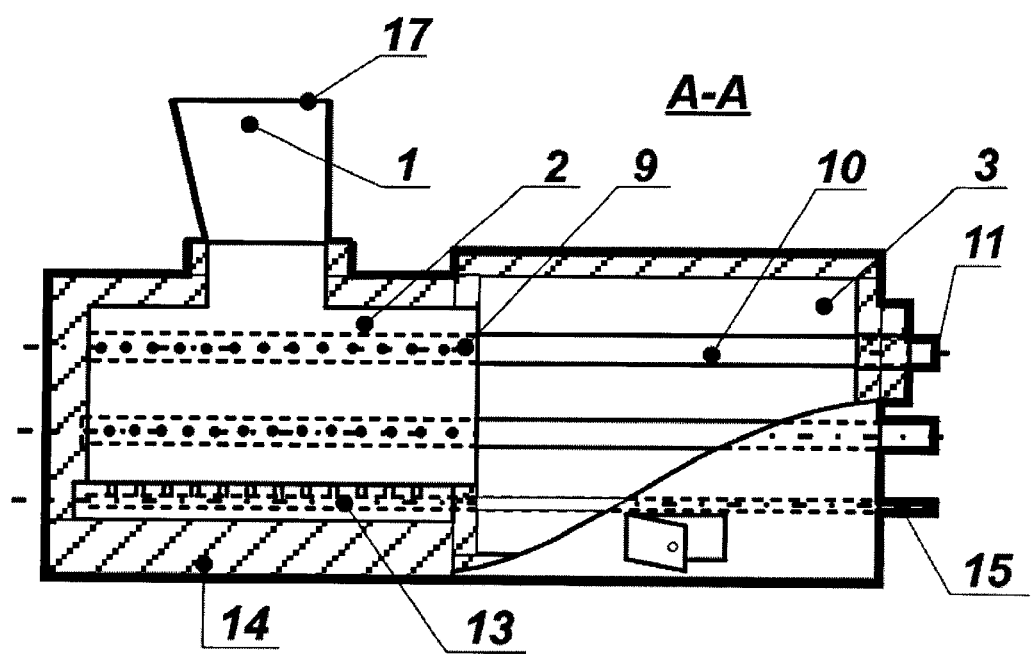
FIG. 2 gives an A—A lengthwise section of FIG. 1.
Figure 7:
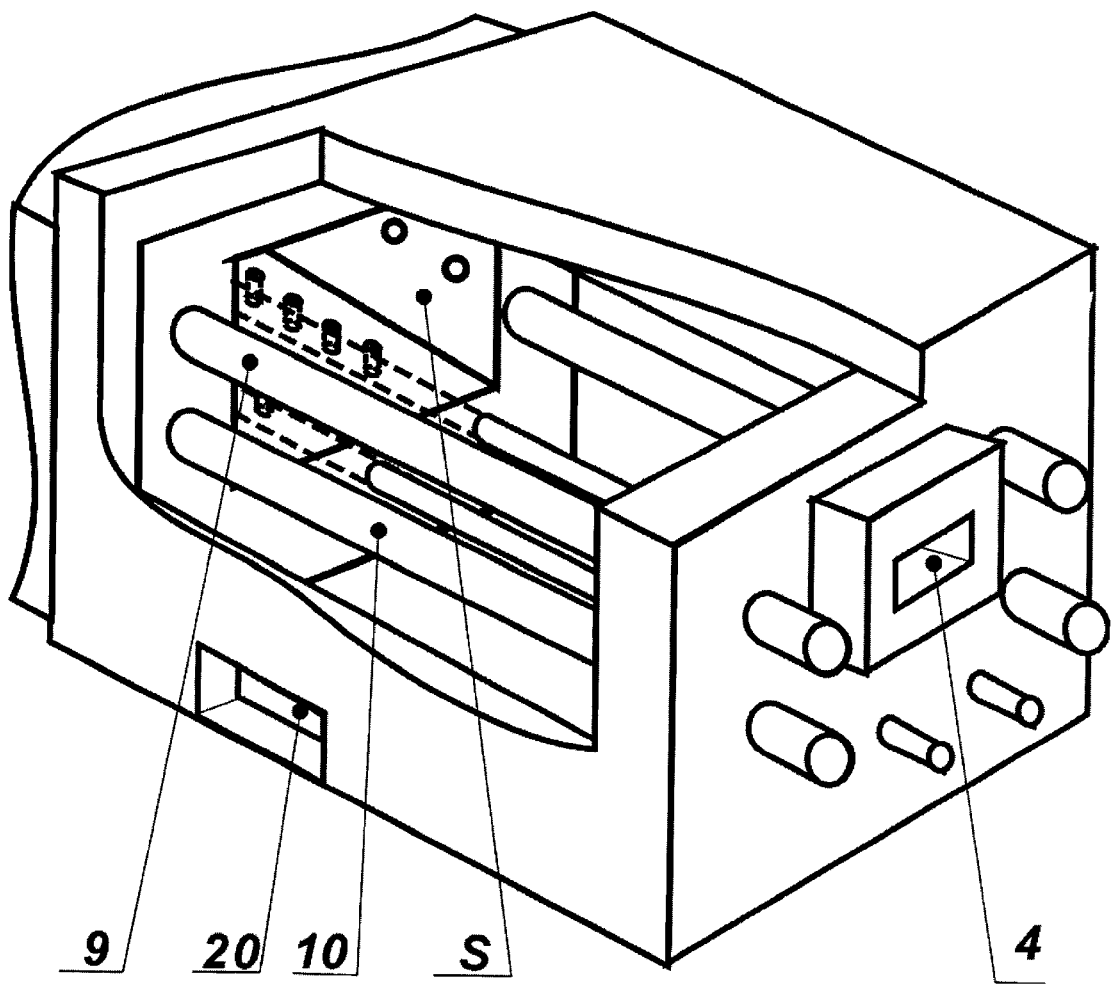
Figure 8:
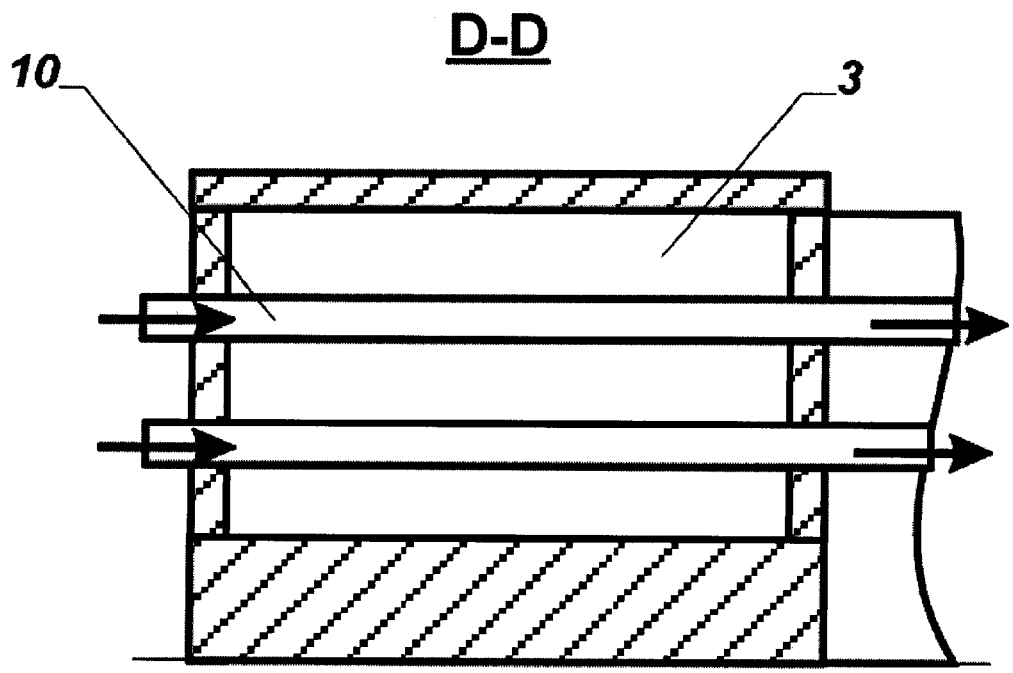
FIG. 8 gives an D—D section of FIG. 1.
Figure 9:
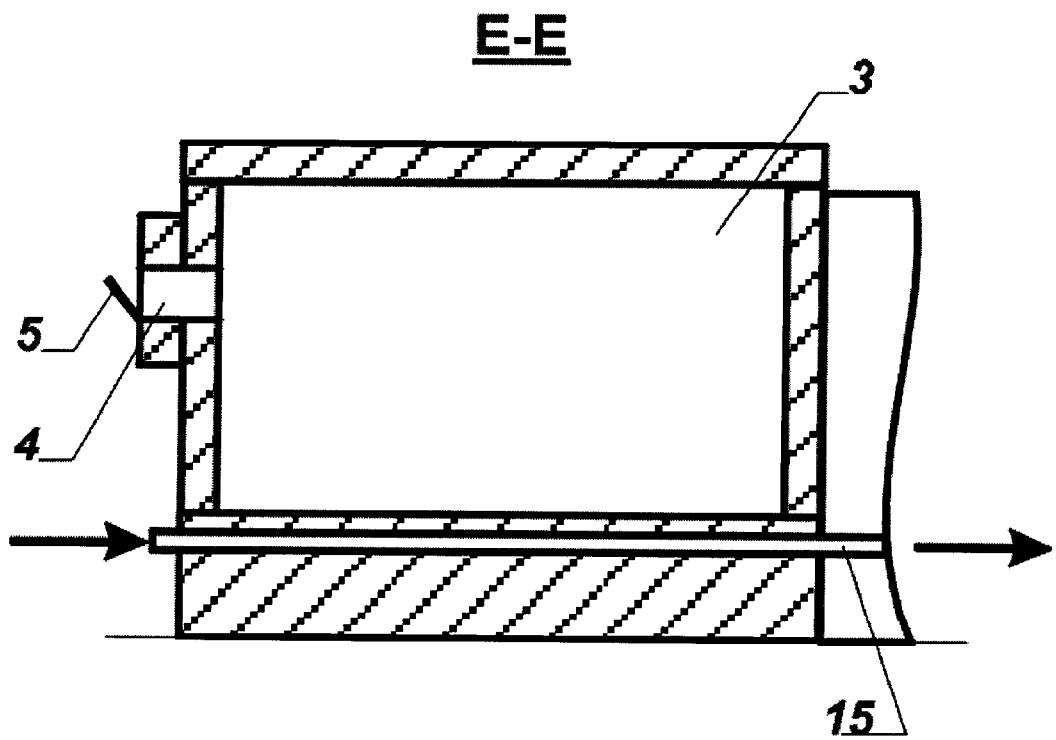
Figure 10:
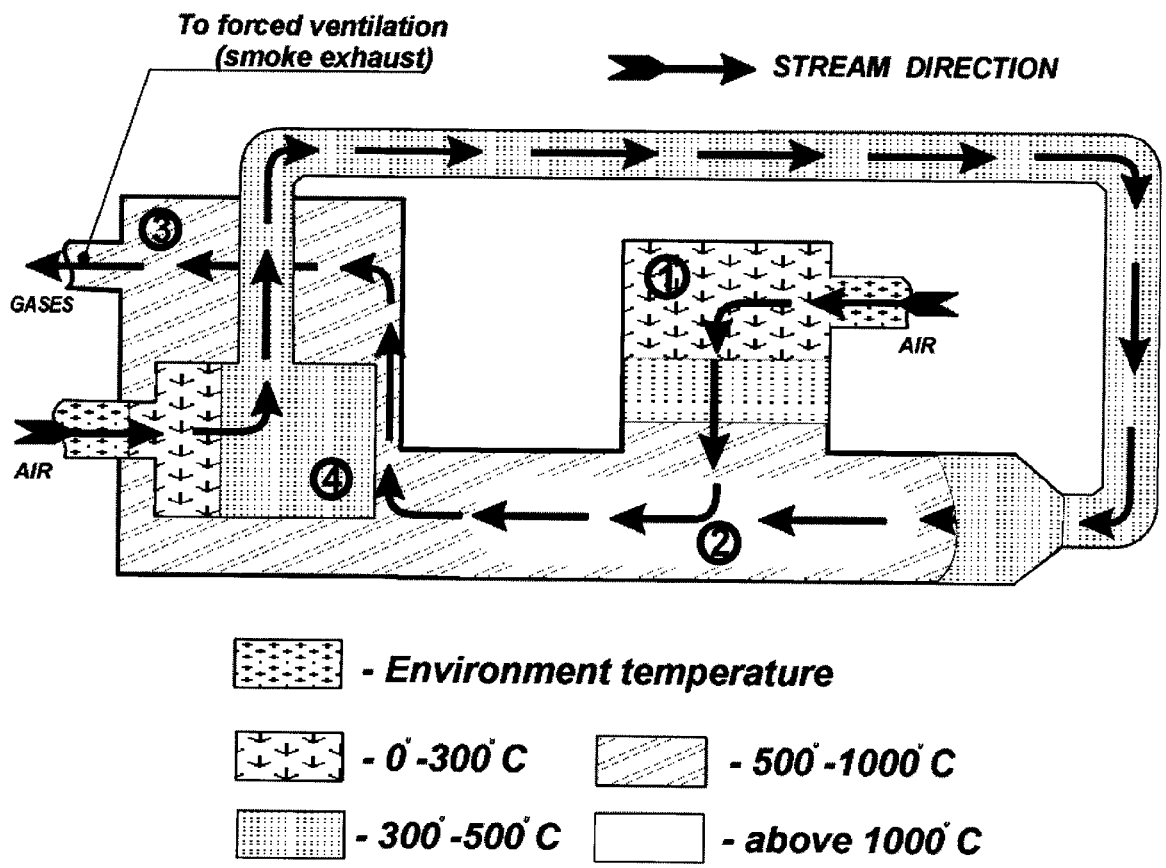
FIG. 10, a functional diagram of gaseous exchange in the proposed furnace is shown.

In the drawings given here, the shaft loading hopper 1 located above the combustion chamber 2, and the expansion chamber 3 are shown; together, they form the heating flue of the furnace. The exhaust pipe 4 equipped with the adjustable exhaust system 5 [(not shown)] is located in the upper part of the expansion chamber 3, which is located behind the combustion chamber 2 so that their long axes O—O are coincident; the cross-section area of the expansion chamber 3 is larger than that of the combustion chamber 2, and the planes of the above-mentioned cross-sections of the combustion chamber and the expansion chamber are perpendicular to their common long axis, which is at the same time their symmetry axis. The area of the through aperture S between the combustion chamber 2 and the expansion chamber 3 corresponds to the cross-section area of the combustion chamber 2. The drawings also show air supply to the combustion chamber 2, including frontal, lateral and lower air supplies. Frontal air supply to the combustion chamber 2 includes several through channels 6 located inside the chamber 2 and along its lateral walls 7; those channels communicate with the chamber 2 via the through holes 8, each of the through channels 6 communicating with one end of a corresponding pipe 10 via the inlets 9; each of those pipes is located in the internal space of the expansion chamber 3 and has the other end 11 open to the atmosphere; lateral air supply to the combustion chamber 2 includes the through holes 12 communicating with the internal space of the chamber 2 and also with the through frontal air supply channels 6; lower air supply to the combustion chamber 2 includes several channels 13 located inside the chamber 2 and along its lower wall 14; those channels communicate with the pipes 15, which are located inside the expansion chamber 3 and have one end open to the atmosphere; each channel 13 communicates with the internal space of the combustion chamber 2 via the through holes 16 located in between. The common long axis O—O of the combustion (2) and extension (3) chambers is their symmetry axis; the long axes of the pipes 10 and 15 located in the expansion chamber 3 and those of the through channels 6 and 13 communicating with the pipes are coincident and are parallel to each other and to the combustion (2) and expansion (3) chambers' common symmetry axis O—O. The through holes 12 intended for lateral air supply to the combustion chamber 2 are grouped in pairs so that (see FIG. [4] 5) the O2—O2 axes of the holes 12 in each pair intersect within the bounds of the neighboring half of the combustion chamber's (2) internal space. The axes of the through channels 16 intended for lower air supply to the combustion chamber 2 can be parallel to each other and perpendicular to the long axes of the channels 13 located in the lower wall 14 of the combustion chamber 2. The loading hopper 1 is equipped with a cap 17 arranged with a clearance ensuring air access for the exhaust of water vapor and hot volatile fractions that form in the loading hopper during wood pyrolysis. Air supplies to the combustion chamber 2 are arranged so that the amounts of air entering the chamber 2 via frontal and lateral supplies are related as 10:1, while for frontal and lower supplies, this ratio becomes 100:1. This ratio is taken into consideration when calculating the number and diameters of the channels 6 and 13, and those of the holes 12 and 16, via which air enters the combustion chamber 2. There is a clearance X inside the combustion chamber 2 between the outlets 8 of the through channels 6 and the internal [space] surface 18 of the chamber's (2) front wall 19 located opposite to the outlets; the clearance X serves for frontal air passage from the through channels 6 to the combustion chamber 2. In the lower part of the expansion chamber 3 there is a door 20 for ash removal. The cross-section of the expansion chamber 3 is greater than that of the combustion chamber 2, which ensures ash settling in the expansion chamber 3 because the combustion products' stream slows down after it passes from the combustion chamber 2 to the expansion chamber 3. All elements of the proposed furnace construction are made of readily available inexpensive materials (e.g. high-temperature ceramics) suitable for the furnace's designed use.

The above-listed furnace design is so simple that it allows for modular production with subsequent assembling and mounting in site. The pipes 10 located in the expansion chamber 3 are made of high-temperature ceramics with high heat-mass transmission coefficient. Maximum heat insulation of the combustion (2) and expansion (3) chambers is ensured by using suitable heat-resistant and heat-insulating materials, e.g. fire-bricks. To create special high-temperature conditions in the furnace proposed, oxygen injection can be used; for that, oxygen-enriched air can be forcedly supplied to the channels 13 located in the lower wall 14 of the combustion chamber 2. It is noteworthy that heated atmospheric air entering the channels 6 and 13 promotes additional heating of the combustion chamber's (2) walls 7 and 14 thus featuring high efficiency of fuel burning.

INDUSTRIAL APPLICATIONS

The proposed furnace functions as follows:

First, the exhaust system 5 is turned on to establish negative pressure in the exhaust pipe 4 and the combustion (2) and expansion (3) chambers. The internal space of the combustion chamber 2 and the loading hopper 1 are charged with fuel. After that, the fuel is ignited, and the cap 17 is put down. The temperature of combustion products entering the expansion chamber 3 rises as fuel burns away in the combustion chamber 2. The pipes 10 and 15 heat up and so does the atmospheric air contained therein, which then enters the combustion chamber 2 and participates in the burning process as an oxidant. This, in turn, results in an even higher combustion temperature, and the process repeats until an equilibrium is established between the amount of air entering the combustion chamber 2 and that of fuel that can entirely burn in this amount of air. After that, the combustion temperature does not rise any more, nor does the furnace's power output; thus, stationary mode of operation is established.

When the furnace already in operation is charged with a high-calorie fuel (e.g., coal), the temperature in the combustion chamber 2 rises and the density of the combustion products falls down, resulting in a lower amount of atmospheric air entering the combustion chamber 2. This is due to the fact that the pressure produced by the forced ventilation (smoke exhauster) depends on the temperature of combustion products entering there. The lower the temperature, the more pressure is produced by the forced ventilation (smoke exhauster). Therefore, pressure produced by the forced ventilation falls, the amount of the atmospheric air entering the combustion chamber 2 lowers, thus lowering the intensity of fuel burning in it.

When a low-calorie fuel enters the combustion chamber 2, the temperature in it lowers at first, and the combustion products' density rises. This results in an increasing pressure produced by the forced ventilation (smoke exhauster). Therefore, more atmospheric air is consumed, which results in a stronger burning in the combustion chamber 2.

It is evident that the ensemble of the proposed furnace's features provides for negative feedback ensuring a self-regulating process of fuel burning. In that way, constant power output of the furnace is promoted, regardless of fuel caloricity. The furnace's maintenance is simple, in practice it is reduced to monitoring the presence of fuel in the loading hopper. The furnace's power density is close to a maximum possible as long as heat energy obtained during does not get lost but serves for high burning efficiency. At the same time, the furnace's design is so simple that it allows for modular production with subsequent assembling and mounting it site.

The foregoing allows one to state that the above-listed advantages of the proposed furnace are realized only if one takes advantage of all its features, each feature serving for a specific function, whereas taken together and interacting, they provide a solution to the problem.

What is claimed is:

1. A furnace, comprising a shaft loading hopper located above the combustion chamber, a heated air supply to the combustion chamber, an exhaust pipe provided with an adjustable exhaust system characterized in that an expansion chamber is located behind the combustion chamber, so that long axes of the expansion chamber and combustion chamber are coincident, the cross-section area of the expansion chamber exceeding the cross-section area of the combustion chamber, the heated air supply to the combustion chamber provides a supplied air temperature as close as possible to that of a gas from said expansion chamber and includes frontal, lateral and lower air supply, the frontal air supply to a combustion chamber includes several pipes located in an internal space of the expansion chamber, one end of each pipe is open to the atmosphere, while the other end communicate with an inlet of a corresponding through channel, which is located inside and along walls of the combustion chamber, the outlet of the channel communicates with an internal space of the combustion chamber, the lateral air supply to the combustion chamber is designed in the form of several through holes in lateral walls of the combustion chamber, allowing for the internal space of the combustion chamber communication with frontal air supply channels, the lower air supply to the combustion chamber includes several pipes located in the internal space of the expansion chamber, one end of each pipe is open to the atmosphere, while the other end communicates with the inlet of one of the corresponding through channels located inside and along a lower wall of the combustion chamber, each of the corresponding through channels communicating with the internal space of the combustion chamber via the through holes located in between.

2. The furnace according to claim 1, wherein the common long axis of the combustion and expansion chambers form a common symmetry axis.

3. The furnace according to claim 2, wherein the long axes of the pipes located in the expansion chamber, and those of the channels communicating with the pipes and located inside and along the lateral and lower walls of the combustion chamber are coincident.

4. The furnace according to claim 3, wherein the common long axes of the pipes and channels are parallel to each other and to the common symmetry axis of the combustion and expansion chambers.

5. The furnace according to claim 1, wherein the through holes, serving for the lateral air supply to the combustion chamber, are grouped in pairs so that the axes of the holes in each pair intersect within a half of the combustion chamber's internal space.

6. The furnace according to claim 1, wherein the axes of the through holes serving for the lower air supply to the combustion chamber are parallel to each other and perpendicular to the long axis of the channels located inside and along the lower wall of the combustion chamber.

7. The furnace according to claim 1, wherein the loading hopper is provided with a cap installed so that air access is ensured for the exhaust of water vapor and hot volatile fractions, which form during wood pyrolysis.

8. The furnace according to claim 1, wherein the amounts of air entering the combustion chamber via frontal and lateral supplies, are related as 10:1, while for frontal and lower supplies this ratio is 100:1.

9. The furnace according to claim 1, wherein the number and diameters of the through holes and channels in the combustion chamber, and those of the pipes in the expansion chamber, are calculated taking into account the necessary amounts of air entering the combustion chamber via frontal, lateral and lower supplies.

10. The furnace according to claim 1, wherein the lower air supply ensures lower ash caking.

11. The furnace according to claim 1, wherein, to promote frontal air passage from the through channels located inside and along the lateral walls of the combustion chamber, to the combustion chamber, a clearance is arranged between the inside of the front wall of the combustion chamber and the corresponding through channel of the front wall with outlets.

12. The furnace according to claim 1, wherein the expansion chamber is provided with a door in a lower part of the expansion chamber serving for ash removal.

13. The furnace according to claim 1, wherein the cross-section area of the expansion chamber is much greater than that of the combustion chamber to ensure ash settling in the expansion chamber.

14. The furnace according to claim 1, wherein all furnace elements are made of high-temperature ceramics.

15. The furnace according to claim 1, wherein the material and diameter of the pipes located in the expansion chamber, and thickness of the walls, are chosen to provide for the combustion products' temperature in the expansion chamber as close as possible to that of the temperature of air in those pipes.

16. The furnace according to claim 1, wherein a forced supply of oxygen-enriched air to the channels located in the combustion chamber's lower wall is provided, allowing for establishing special high-temperature conditions in the combustion chamber.

17. The furnace according to claim 1, wherein heat-insulation of the combustion and expansion chambers is ensured using a low heat-conducting material.

* * * * *